(12) United States Patent
Hull et al.

(10) Patent No.: US 9,846,527 B2
(45) Date of Patent: Dec. 19, 2017

(54) TASK MANAGEMENT FROM WITHIN A DATA FEED

(71) Applicant: Microsoft Technology Licensing, LLC, Redmond, WA (US)

(72) Inventors: Mark Hull, San Jose, CA (US); Anand Kishore Bollini, Palo Alto, CA (US); Roland Schemers, Woodside, CA (US); Clayton Schubiner, Burlingame, CA (US); Christopher J. Fong, San Mateo, CA (US); Wing Lun Ting, San Francisco, CA (US); James Richards, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 14/266,573

(22) Filed: Apr. 30, 2014

(65) Prior Publication Data

US 2015/0317073 A1  Nov. 5, 2015

(51) Int. Cl.
| G06F 3/048 | (2013.01) |
| G06F 3/0484 | (2013.01) |
| H04L 29/08 | (2006.01) |
| H04W 4/08 | (2009.01) |
| H04W 4/20 | (2009.01) |
| G06Q 10/10 | (2012.01) |
| G06Q 50/00 | (2012.01) |

(52) U.S. Cl.
CPC ........ *G06F 3/0484* (2013.01); *G06F 3/04842* (2013.01); *G06F 3/04847* (2013.01); *G06Q 10/103* (2013.01); *G06Q 50/01* (2013.01); *H04L 67/22* (2013.01); *H04W 4/08* (2013.01); *H04W 4/206* (2013.01)

(58) Field of Classification Search
None
See application file for complete search history.

(56) References Cited

U.S. PATENT DOCUMENTS

| 8,249,906 | B2 * | 8/2012 | Ponce de Leon | G06Q 10/06 705/28 |
| 8,639,552 | B1 * | 1/2014 | Chen | G06F 9/4881 705/7.21 |
| 8,788,590 | B2 * | 7/2014 | Culver | G06F 17/5004 709/205 |
| 9,727,376 | B1 * | 8/2017 | Bills | G06F 9/4881 |
| 2004/0021686 | A1 * | 2/2004 | Barberis | G06Q 10/10 715/738 |

(Continued)

*Primary Examiner* — Mahelet Shiberou
(74) *Attorney, Agent, or Firm* — Schwegman Lundberg & Woessner, P.A.

(57) ABSTRACT

A system, computer-readable storage medium, and computer-implemented method for assigning a task based on content presented in a data feed are presented. A data feed that includes a set of content items is presented. Each of the content items included in the data feed may include a graphical user interface element capable of invoking task assignment functionality with respect to each content item. A task based on a content item presented in the data feed may be created and assigned to a selected user in response to receiving a selection of the graphical user interface element. The method may further include generating an individual status report for the user that includes every task assigned to the user.

14 Claims, 12 Drawing Sheets

(56) References Cited

U.S. PATENT DOCUMENTS

| | | | |
|---|---|---|---|
| 2005/0198209 A1* | 9/2005 | Barrett | G06F 9/5055 709/219 |
| 2007/0073575 A1* | 3/2007 | Yomogida | G06Q 10/063114 705/7.15 |
| 2007/0143169 A1* | 6/2007 | Grant | G06Q 10/06 705/7.14 |
| 2007/0277122 A1* | 11/2007 | Frijlink | G06F 9/4443 715/854 |
| 2008/0059267 A1* | 3/2008 | Hamilton | G06Q 10/00 705/7.15 |
| 2010/0004921 A1* | 1/2010 | Hufnagel | G06F 17/2881 704/9 |
| 2010/0287023 A1* | 11/2010 | Knobel | G06Q 10/06 705/7.13 |
| 2011/0271220 A1* | 11/2011 | Remsberg | G06Q 10/06 715/772 |
| 2011/0276396 A1* | 11/2011 | Rathod | G06F 17/30867 705/14.49 |
| 2012/0130907 A1* | 5/2012 | Thompson | G06Q 10/103 705/301 |
| 2013/0073343 A1* | 3/2013 | Richardson | G06Q 30/02 705/7.38 |
| 2013/0179799 A1* | 7/2013 | Savage | G06Q 10/103 715/751 |
| 2013/0262527 A1* | 10/2013 | Hunter | G06F 3/0484 707/805 |
| 2014/0019187 A1* | 1/2014 | Olsen | G06Q 10/06313 705/7.23 |
| 2014/0137003 A1* | 5/2014 | Peters | G06Q 10/101 715/758 |
| 2015/0254612 A1* | 9/2015 | Mills | G06Q 10/103 705/7.15 |

* cited by examiner

TASK MANAGEMENT FROM WITHIN A DATA FEED

TECHNICAL FIELD

This patent document pertains generally to data processing systems, and more particularly, but not by way of limitation, to a platform for workplace collaboration.

BACKGROUND

Traditional enterprise social network services provide users with a platform for internal communication within organizations (e.g., companies or firms). Within such platforms, users may create discussion threads to communicate and exchange ideas regarding ongoing projects, tasks, and other such action items. Although such communications may relate to pieces of work that need to be done, the enterprise social network services hosting these communications are typically limited in that they do not provide any integrated task management services (e.g., tracking and assigning). User who may wish to track and assign tasks or other action items from a discussion thread must instead use additional third party tools and services to create, assign, and track the status of tasks. Switching between multiple tools (e.g., an enterprise social network service and a task management service) often leads to inefficiencies as some items may be over looked and some efforts must inevitably be duplicated. Further, important information may be scattered between the two tools because users in the organization may be uncertain as to which tool should be used to provide status updates and other feedback.

BRIEF DESCRIPTION OF DRAWINGS

Various ones of the appended drawings merely illustrate example embodiments of the present invention and cannot be considered as limiting its scope.

FIG. 3A is an interface diagram illustrating a feed interface, according to an example embodiment.

FIG. 3C is an interface diagram illustrating a task assignment confirmation window overlaid upon the feed interface, according to an example embodiment.

DETAILED DESCRIPTION

Figure 1:
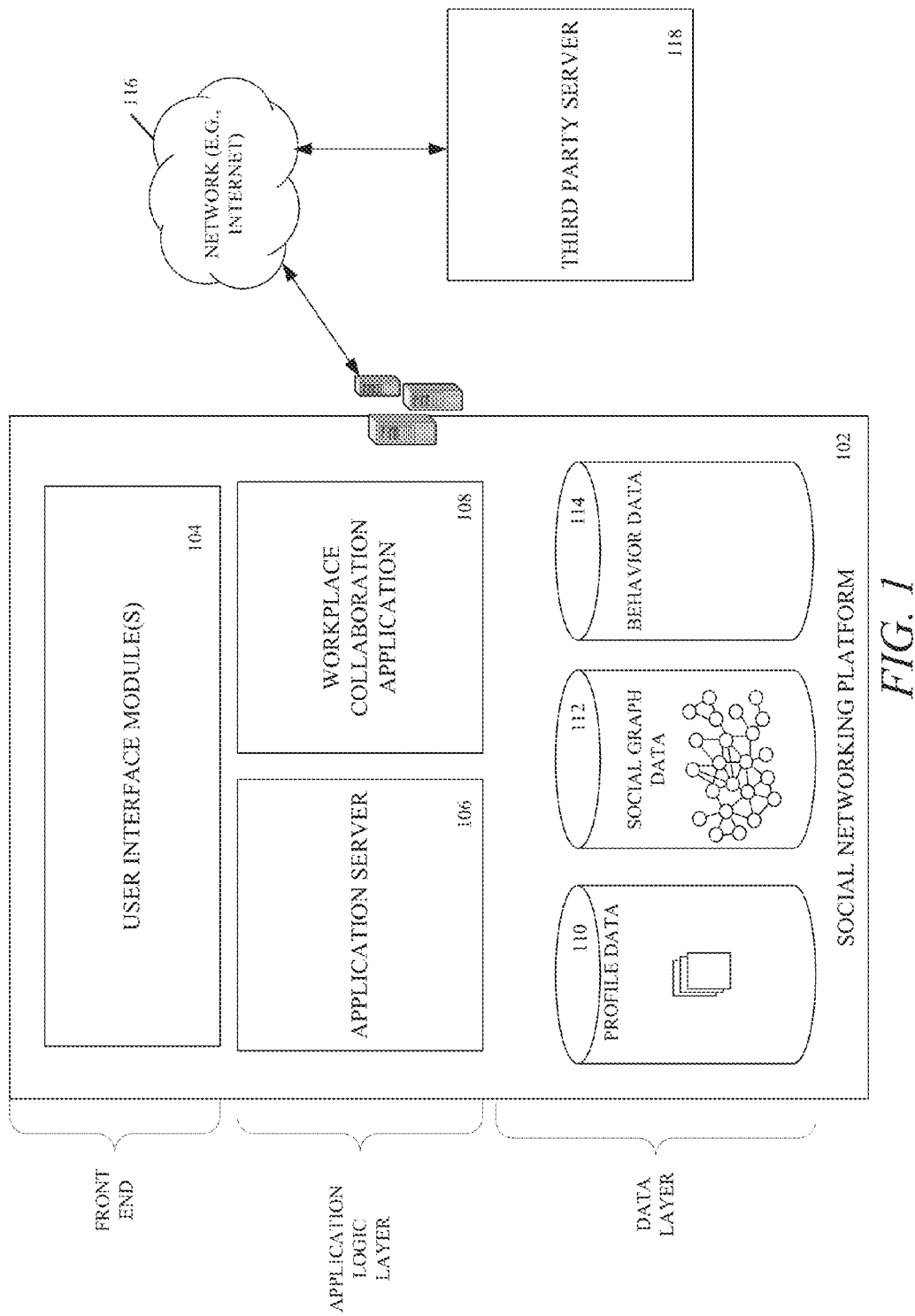
FIG. 1 is a block diagram illustrating various functional components of a social network platform, according to an example embodiment.

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details. In accordance with the present disclosure, components, process steps, and data structures may be implemented using various types of operating systems, programming languages, computing platforms, computer programs, and/or general purpose machines.

Aspects of the present disclosure include a system and methods for providing task management services as part of a social networking platform. The task management services may include creating, assigning, and tracking tasks that may, for example, be created from content presented in a data feed. Consistent with some embodiments, the method may include presenting a data feed including multiple content items such as status updates. Each content item may include a graphical user interface element capable of invoking task assignment functionality with respect to each item. The method may further include receiving a user selection of the graphical user interface element and an identifier of a user to assign the task to. Responsive to receiving this user input, the system may generate a task and assign it to the identified user.

Consistent with some embodiments, the method may further include generating an individual status report for the user including every task assigned to the user and a respective status of each task. In instances in which the task is part of a larger project comprised of multiple tasks, the method may further include generating a project status report that includes each task that is part of the project, a respective status of each task, and a status of the overall project.

In an illustrative example from the perspective of a user, a user may initially access a social network service account and view a personalized data feed that includes status updates or other similar social network posts from other users of the social network service that the user is affiliated with. The presentation of each status update (or similar post) may include buttons for the user to comment, share, or express a liking for the status update. The presentation of each status update may further include a button for creating and assigning a task based on the status update. Upon selecting the task button, the user may be presented with an additional window to specify an additional user to which the user is assigning the task based on the status update. The user may be presented with an additional confirmation window with information about the task before the task is ultimately created and assigned to the additional user. In some instances, the user may be a manager of a project to which the task belongs. In these instances, the user may be able to access a project status report that includes a list of all tasks that are part of the project, the respective statuses of each task, and an overall status of the project.

From the perspective of the additional user, the additional user may receive a message notifying him of the assigned task. The additional user may then be able to view and track the progress of the task. Also, the additional user may be able to access an individual task report listing all tasks that he is assigned and each task's respective status.

FIG. 1 is a block diagram illustrating various functional components of a social networking platform 102. As shown in FIG. 1, the social networking platform 102 is generally based on a three-tiered architecture, consisting of a front-end layer, application logic layer, and a data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be supported by a social network system to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end consists of a user interface module (e.g., a web server) 104, which receives requests from various client-computing devices, and communicates appropriate responses to the requesting client devices. For example, the user interface module(s) 104 may receive requests from client devices in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown, the application logic layer includes various application server(s) 106, which, in conjunction with the user interface module(s) 104, generates various user interfaces (e.g., web pages) with data retrieved from various data sources in the data layer. With some embodiments, individual application servers 106 are used to implement the functionality associated with various services and features of the social networking platform 102. For instance, the ability of an organization to establish a presence in the social graph of the social networking platform 102, including the ability to establish a customized web page on behalf of an individual or organization, and to publish messages or status updates on behalf of an individual or organization, may be services implemented in independent application servers 106. Similarly, a variety of other applications or services that are made available to members of the social networking platform 102 will be embodied in their own application servers 106.

As illustrated in FIG. 1, the application layer also includes a workplace collaboration application 108 that provides various workplace collaboration services to users. For example, the workplace collaboration application 108 may provide a platform for users to collaborate on documents or presentations. The workplace collaboration application 108 may also provide a platform for users to engage in conversations pertaining to workplace projects. Each project may comprise a number of tasks. As such, the workplace collaboration application 108 may also provide task management services (e.g., creating, assigning, and managing tasks) to users. Further details of the modules comprising the workplace collaboration application 108 are presented below in reference to FIG. 2. Although the workplace collaboration application 108 is illustrated in FIG. 1 as being integrated and operating in conjunction with the social networking platform 102, it shall be appreciated that with various alternative embodiments, the workplace collaboration application 108 may be implemented within its own application server module such that it operates as a stand-alone application.

As shown in FIG. 1, the data layer includes several databases, including member profile database 110 for storing general information contained on a social network profile, including general contact information, employer information, educational institution information, as well as information concerning various online or offline groups. Member profile database 110 may contain information for member profiles for only a single social network profile or for profiles on several different social networks. As used herein "member" or "user" refers to an individual (e.g., a person), an entity, a business (e.g., a company), an organization, a group of people, a bot, or any combination thereof that utilizes the services provided by the social networking platform 102.

Consistent with some embodiments, when a person initially registers to become a member of a social network service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored, for example, in the member profile database 110. Similarly, when a representative of an organization initially registers the organization with the social network service, the representative may be prompted to provide certain information about the organization. This information may be stored, for example, in the member profile database 110.

Member profile database 110 may also contain contact information such as lists of contacts, previous employers, interests, organizational affiliations, as well as personal and professional: addresses, phone numbers and websites. With some embodiments, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

As shown in FIG. 1, the data layer also includes social graph database 112, which is a particular type of database that uses graph structures with nodes, edges, and properties to represent and store data. Of course, with various alternative embodiments, any number of other entities might be included in the social graph, and as such, various other databases may be used to store data corresponding with other entities.

Once registered, a member of social networking platform 102 may invite other members, or be invited by other members, to connect via the social networking platform 102. A "connection" may require a bi-lateral agreement by the members, such that both members acknowledge the establishment of the connection. Similarly, a member may elect to "follow" another member. In contrast to establishing a "connection", the concept of "following" another member typically is a unilateral operation, and at least with some embodiments, does not call for acknowledgement or approval by the member that is being followed. When one member follows another, the member who is following may receive automatic notifications about various activities undertaken by the member being followed. In addition to following another member, a user may elect to follow a company, a topic, a conversation, or some other entity. Similarly, when a member follows an organization, the member becomes eligible to receive messages or status updates published on behalf of the organization. For instance, messages or status updates published on behalf of an organization that a member is following will appear in the member's personalized data feed. For purposes of the present disclosure, the term "connection" shall include both the bi-lateral agreement by both members and the unilateral operation of "following". The various associations and relationships that the members establish with other members, or with other entities and objects, are stored and maintained within the social graph database 112.

The social networking platform 102 may also provide a broad range of other applications and services that allow members the opportunity to share and receive information, often customized or personalized to the interests of the member. For example, the social networking platform 102 may include a photo sharing application that allows members to upload and share photos with other members. As such, at least with some embodiments, a photograph may be a property or entity included within a social graph. Members of the social networking platform 102 may be able to self-organize into groups, or interest groups, organized around a subject matter or topic of interest. Accordingly, the data for a group may be stored in social graph database 112. When a member joins a group, his or her membership in the group will be reflected in the social graph data stored in the social graph database 112. With some embodiments, members may subscribe to or join groups affiliated with one or more companies. For instance, with some embodiments, members of the social networking platform 102 may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modeled with the social graph data of the social graph database 112.

As members interact with various applications, services and content made available via the social networking platform 102, the member's behavior (e.g., content viewed, links or buttons selected, messages responded to, etc.) may be tracked and information concerning the member's activities and behavior may be logged or stored, for example, as indicated in FIG. 1 by behavior database 114. This information may be used to classify the member as being in various categories. For example, if the member performs frequent searches of job listings, thereby exhibiting behavior indicating that the member is a likely job seeker, this information can be used to classify the member as a job seeker. This classification can then be used as a member profile attribute for purposes of enabling others to target the member for receiving messages or status updates. Accordingly, a company that has available job openings can publish a message that is specifically directed to certain members of the social network service who are job seekers, and thus, more likely to be receptive to recruiting efforts.

Consistent with some embodiments, the social networking platform 102 may provide an application programming interface (API) module via which third-party applications hosted by a third party server 118 may access various services and data provided by the social networking platform 102. For example, using an API, a third-party application may provide a user interface and logic that enables an authorized representative of an organization to publish messages from a third-party application to various data feeds maintained by the social network service. Such third-party applications may be browser-based applications, or may be operating system-specific. In particular, some third-party applications may reside and execute on one or more mobile devices (e.g., phone, or tablet computing devices) having a mobile operating system.

The third party server 118 may be coupled to the communication network 116, for example, via wired or wireless interfaces. The communication network 116 may be a LAN, a WAN, the Internet, or other packet-switched data network. Accordingly, a variety of different configurations are expressly contemplated.

Figure 2:
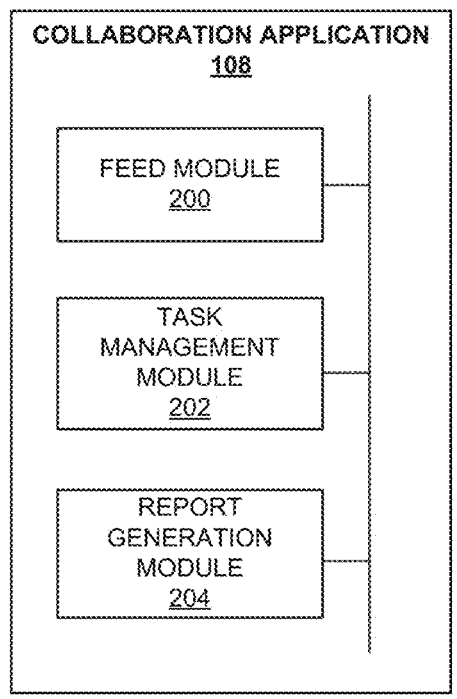
FIG. 2 is a block diagram illustrating various functional modules that form a workplace collaboration application, which is provided as part of the social network platform, according to an example embodiment.

FIG. 2 is a block diagram illustrating various functional modules that form the workplace collaboration application 108, according to an example embodiment. In particular, the workplace collaboration application 108, as illustrated in FIG. 2, includes a feed module 200, a task management module 202, and report generation module 204 all configured to communicate (e.g., access and share common data) with each other (e.g., via a bus, a shared memory, a network, or a switch). The modules 200-204 may furthermore access one or more of the databases 110-114 illustrated in FIG. 1. Any of these modules may be implemented using hardware, as described below with respect to FIG. 8. Moreover, any two or more of these modules may be combined into a single module, and the functions described herein for a single module may be subdivided among multiple modules. It shall be appreciated that although the various functional components of the workplace collaboration application 108 are discussed in the singular sense, multiple instances of one of more of the various functional components may be employed.

As illustrated in FIG. 2, the workplace collaboration application 108 may include a feed module 200, which may be a hardware implemented module, software executed by general purpose or special purpose hardware, or instructions stored on a computer readable medium that is operative to generate data feeds for users of the social networking platform 102. A data feed may include a plurality of content items such as status updates, plain text messages, links to articles or other webpages, images, videos, or other such consumable content. A data feed may be known to those skilled in the art by a variety of different names, including a "stream," "content stream," "status update stream," "network update stream," and/or "news feed." Consistent with some embodiments, with proper authorization, members of the social networking platform 102 may publish messages (referred to herein as "status updates") that are viewable to other members of the social networking platform 102 via one or more data feeds. Skilled artisans may refer to this type of message by many different names, including a "status update," "tweet," or simply, and generically, as a message. In any case, when a member of the social networking platform 102 publishes a status update, the status update may appear may be presented on a web page (e.g., a profile page) of the member whose status update is being published. Additionally, the status update may appear in a personalized data feed (e.g., data feed generated by the feed module 200) of those members of the social network service who have taken some action to subscribe to receive messages published on behalf of the member (e.g., social network connections of the member whose status update is being published). For example, a member of the social networking platform 102 may subscribe to receive messages or status updates published on behalf of an organization by simply selecting or otherwise interacting with a graphical user interface element (e.g., a button) presented on a web page in connection with the organization. The graphical user interface element (e.g., button) may be labelled with the text. "follow," "like," "+1," or something similar. In other instances, the relationship that a member has with a particular entity or organization as defined in the social graph may automatically result in the member being subscribed to receive information from a particular entity. For example, if a member indicates in his or her member profile that the member is employed with a particular company, attending a particular school, graduated from a particular school, and so forth, this information may be used as the basis for automatically subscribing the member to receive information published on behalf of a particular entity or organization.

Consistent with some embodiments, the data feeds generated by the feed module 200 and presented on client devices of users may include graphical user interface elements (e.g., buttons) that allow users to take one of more actions with respect to each of the content items presented therein. In particular, the presentation of a content item within a data feed may include one or more graphical user interface elements for providing feedback pertaining to a content item (e.g., comment), expressing an affinity for a content item (e.g., a like), or sharing a content item with other members. Consistent with some embodiments, the presentation of a content item within a data feed may include a graphical user interface element (e.g., a button) for creating and assigning a task based on a content item. In this manner, the collaboration application 108 not only provides users with a platform to discuss and collaborate on tasks and projects, but also provides task management services in conjunction with such a platform.

To this end, the collaboration application 108 may include a task management module 202, which may be a hardware implemented module, software executed by general purpose or special purpose hardware, or instructions stored on a computer readable medium that is operative to provide task management services to users of the social networking platform 102. For example, the task management module 202 may allow users to create and assign tasks. Tasks may be represented by task objects, which are data structures comprising at least a title and one or more temporal attributes (e.g., a due date). Each task object may be stored in the database 110 and associated with the member profile of the user or group of users to which the task is assigned.

The task management module 202 may further provide users the ability to view and track the progress of tasks that they have been assigned. The progress of tasks may be received from users via a graphical user interface provided by the task management module 202, or in some embodiments, the progress of a task may be automatically inferred by the task management module 202 based on actions taken with respect to or in furtherance of the task. The task management module 202 may further work in conjunction with the report generation module 204 to generate an individual status report with a list of all tasks assigned to a user as well as indicators of the status of each. The individual status report may provide an indication of the status of each task using, for example, text, variable color, a status bar, or any other metric or scale commonly used to denote status of tasks.

In some instances, a project may comprise multiple tasks. In these instances, a manager or other responsible party may wish to track the overall progress of a project including the individual statuses of the tasks making up the project. To this end, the report generation module 204 may work in conjunction with the task management module 202 to generate a project status report that includes a list of all tasks comprising the project. As with the individual status report, the project status report may include an indicator of the status of each task. The project status report may further include an overall status of the project based on the statuses of the tasks comprising the project. The overall status may be statistical summation of the statuses of the tasks. For example, the overall status may be an aggregate of all statuses the tasks, or an average of the same.

Figure 3A:
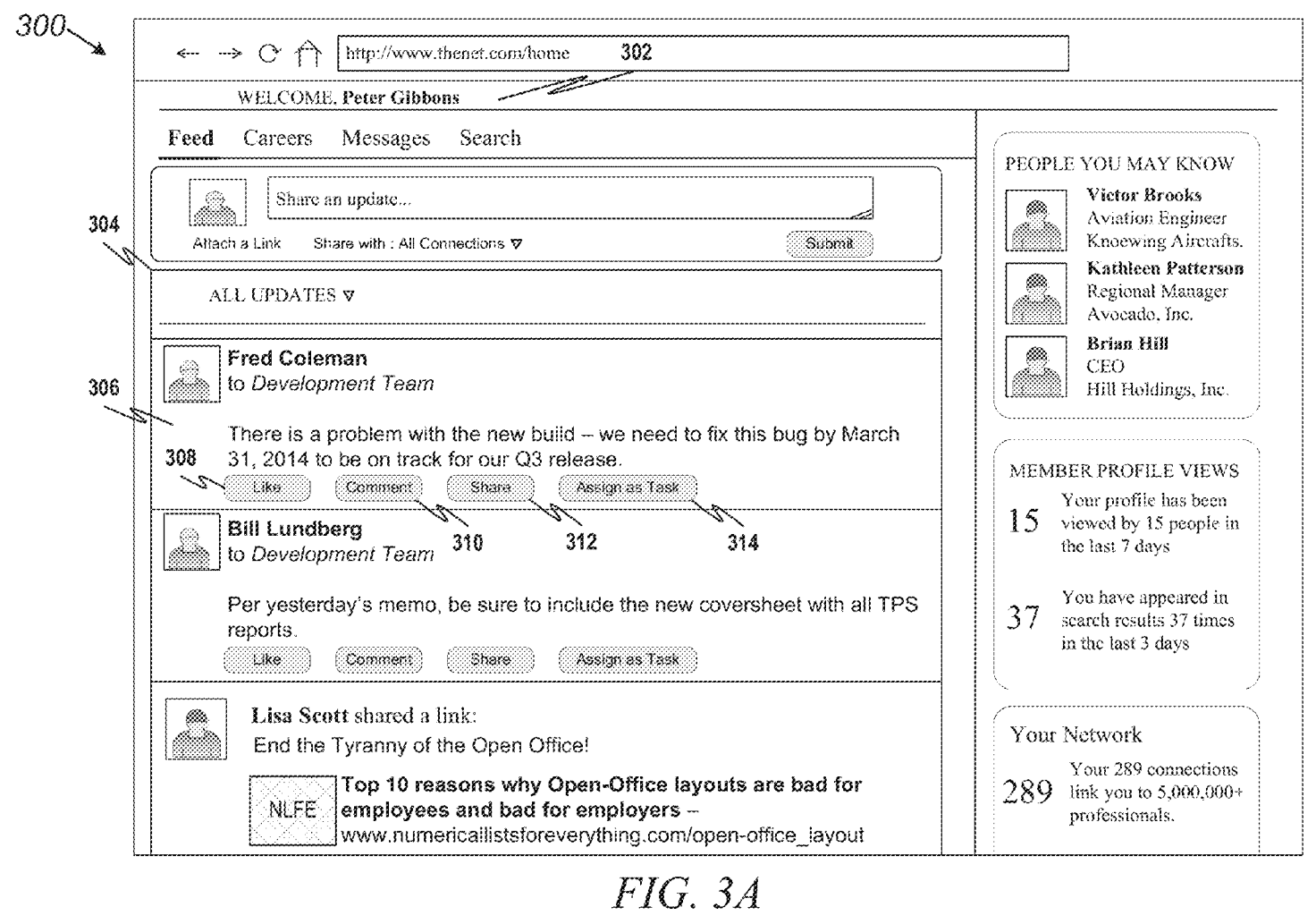

FIG. 3A is an interface diagram illustrating a user interface 300 of the social networking platform 102, according to an example embodiment. As illustrated, the user interface 300 includes an identifier of a user 302 and a personalized data feed 304 of the user 302. The personalized data feed 304 includes multiple content items published on behalf of social connections of the user 302, which are other members of the social networking platform 102. In particular, the personalized data feed 304 includes content item 306 published on behalf of a user 302. As shown, the content item 306 is a textual comment pertaining to a potential task (e.g., "fix the bug") of a project. In some embodiments, the user 302 and the members of the social network whose posts are presented in the personalized data feed 304 may be employed by the same company, and more particularly, may be members of the same organization or group within the company.

As illustrated in FIG. 3A, the presentation of the content item 306 within the personalized data feed may include multiple graphical user interface elements (e.g., buttons) that when selected or otherwise interacted with the user 302 may allow the user 302 to take an action with respect to the content item 306. Specifically, button 308, labelled with the text "like," allows the user 302 to express an affinity for the content item 306. Button 310, labelled with the text "comment." allows the user 302 to add or otherwise associate a comment with the content item 306. Button 312, labelled with the text "share," allows the user 302 to share the content item 306 with other members of the social network platform 102. Button 314, labelled with the text "assign as task," may allow the user 302 to create and assign a task based on the content item 306. Upon receiving a selection of the button 314, the social networking platform 102 may present an additional window to further the task assignment and creation process.

Figure 3B:
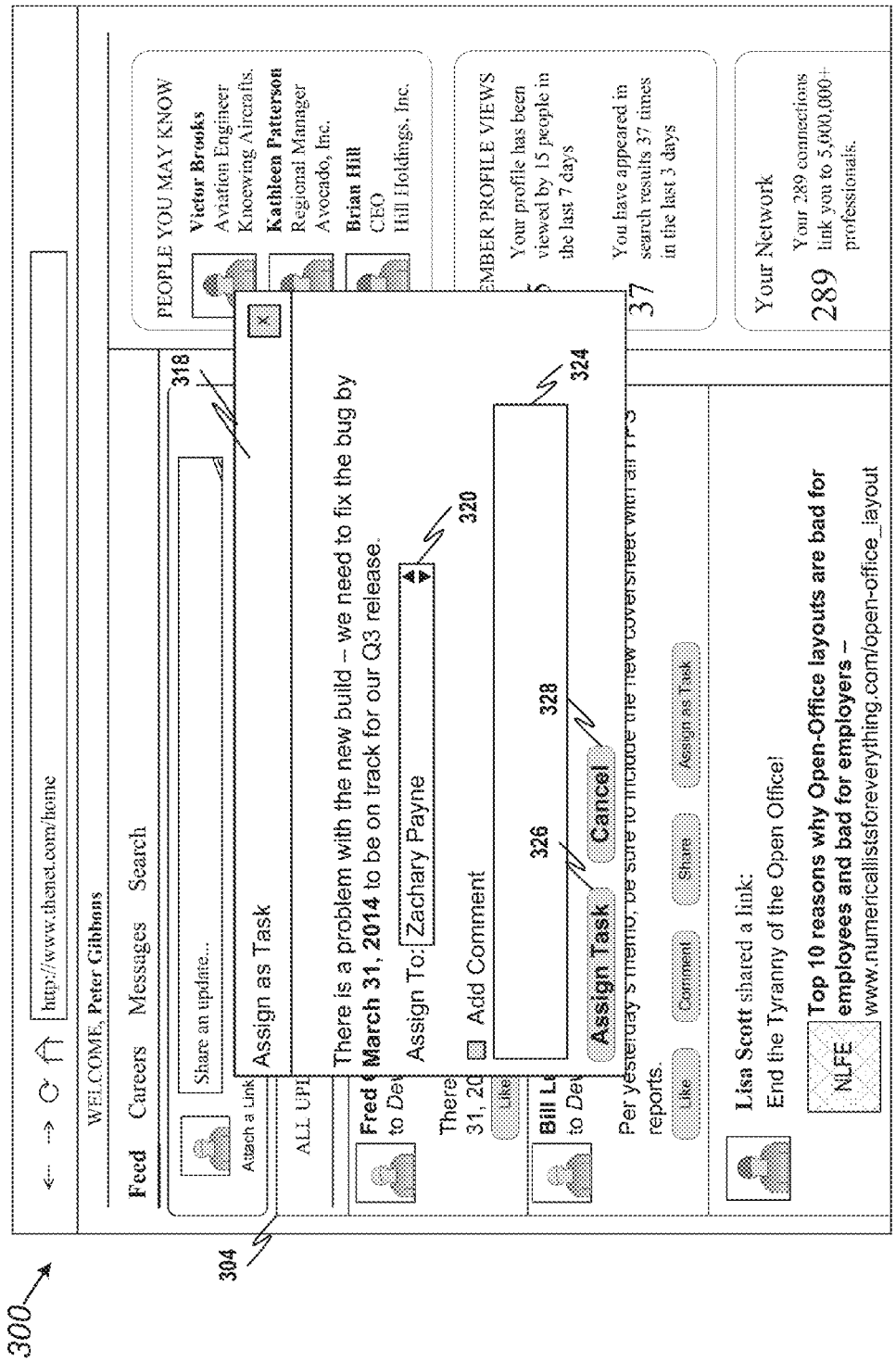
FIG. 3B is an interface diagram illustrating a task assignment window overlaid upon the feed interface, according to an example embodiment.

FIG. 3B is an interface diagram illustrating a task assignment window 318 overlaid upon the personalized data feed 304, according to an example embodiment. As discussed above with respect to FIG. 3A, the task assignment window 318 may be presented by the social networking platform 102 to the user 302 in response to the user 302 selecting the button 314. The task assignment window 318 may reference the content item 306, for which a task is to be created and assigned. The task assignment window 318 may include an assignee field 320, in which the user 302 may identify a user for the task to be assigned to. Although the assignee field 320 is illustrated in FIG. 3B as including a drop-down for selecting members of the social networking platform 102, it shall be appreciated that in some embodiments, the assignee field 320 may allow a user to directly input a name or other identifier (e.g., email address) of a member of the social networking platform 102, or provide any other suitable means for identifying members of the social networking platform 102 to assign the task to.

The task assignment window 318 may further include a comment field 324, which allows the user 302 to add any additional comments or notes to the task. The task assignment window 318 is also illustrated to include buttons 326 and 328, which upon selection by the user 302 may signal the social networking platform 102 to continue or cancel the task creation and assignment process, respectively. Upon receiving selection of the button 326, the social networking platform 102 may present an additional window to the user 302 to confirm the creation and assignment of the task in accordance with the information entered into the task assignment window 318.

Figure 3C:
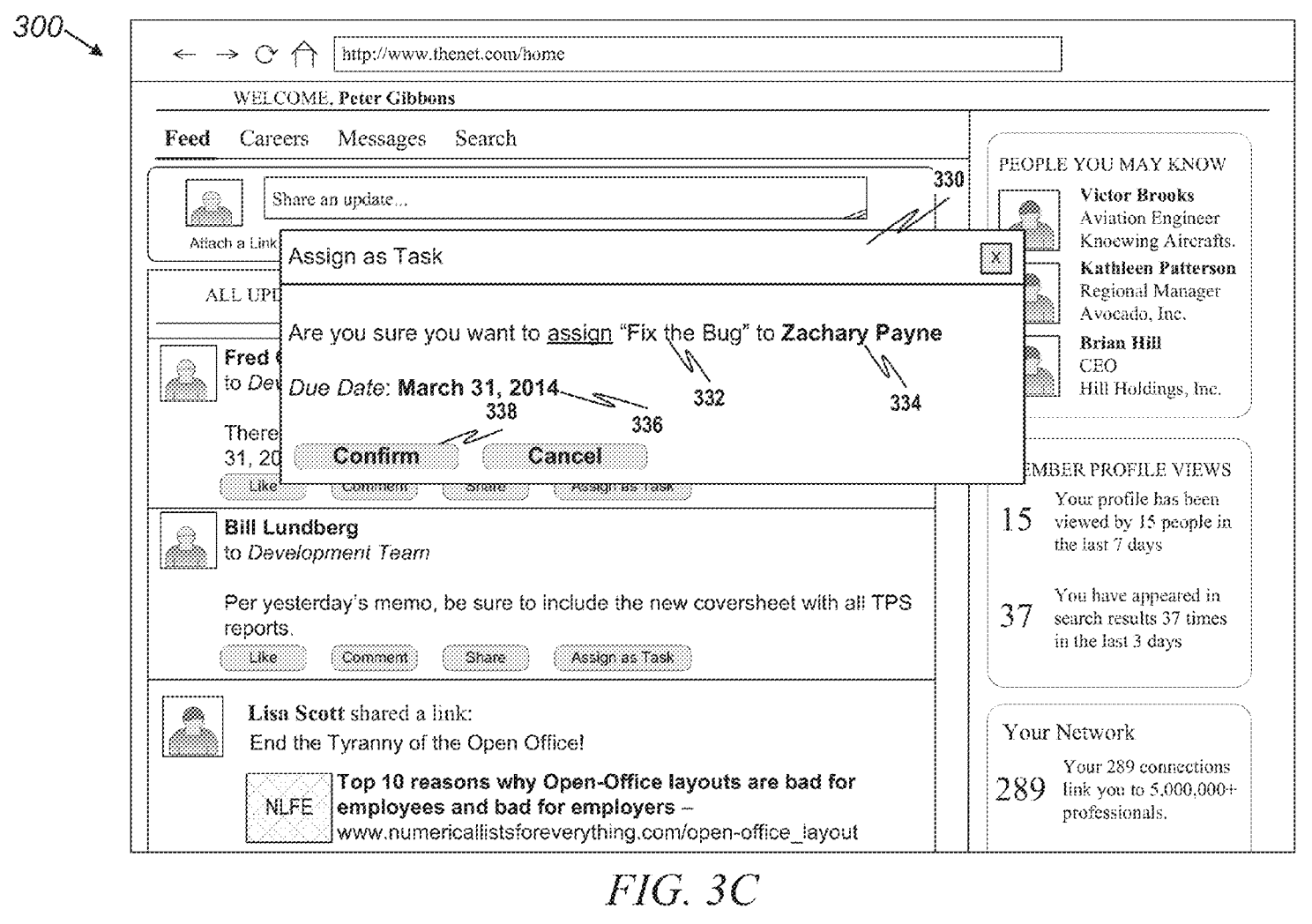

FIG. 3C is an interface diagram illustrating a task assignment confirmation window 330 overlaid upon the personalized data feed 304, according to an example embodiment. As discussed above with respect to FIG. 3B, the task assignment confirmation window 330 may be presented by the social networking platform 102 to the user 302 in response to the user 302 selecting the button 326. As illustrated, the task assignment confirmation window 330 identifies a task title 332 (e.g., "Fix the Bug"), a task assignee 334 (e.g., "Zachary Payne"), and a due date 336 (e.g., Mar. 31, 2014). The task title 332, and due date 336 may be inferred by the task management module 202 from the content item 306, from which the task is based, consistent with some embodiments. The inference of these data items may include utilizing one of several known text analysis and recognition techniques.

In instances in which the task management module 202 is unable to infer a task subject and/or due data (e.g., because these items are not included in the content item 306 from which the task is based), the task assignment confirmation window 328 may include one of more user interface elements to allow the user 302 to manually input this information. In any event, the task assignment confirmation window 330 may allow the user 302 to edit the task title 332 and the due date 336. Upon selection of the button 338, the task management module 202 may generate a task object for the task and assign or otherwise associate the task object with the task assignee 334 (e.g., another member of the social networking platform 102).

Figure 4A:
FIG. 4A is an interface diagram illustrating an individual status report, according to an example embodiment.

FIG. 4A is an interface diagram illustrating an individual status report 400, according to an example embodiment. As shown, the individual status report 400 is the individual status report for the task assignee 334. The individual status report 400 includes each task assigned to the task assignee 334, and as such, the individual status report 400 includes tasks 402, 404, and 406. The task 402 corresponds to the task created from content item 306 discussed in FIGS. 3A-C. As shown, the presentation of each of the tasks 402, 404, and 406 includes a title, a time frame (e.g., a start and end date), and a brief description of the task. The presentations of each of the tasks 402, 404, and 406 include status indicators 408, 410, and 412 to provide an indication of the respective status or progress of each of the tasks 402, 404, and 406. The status of each project, as indicated by the status indicators 408, 410, and 412, may be based on information received from the task assignee 334, other users, automatically inferred information, or any combination thereof. It shall be appreciated that the individual status report 400 is not limited to such information, and in other embodiments, the individual status report may include additional information not shown in FIG. 4A.

Figure 4B:
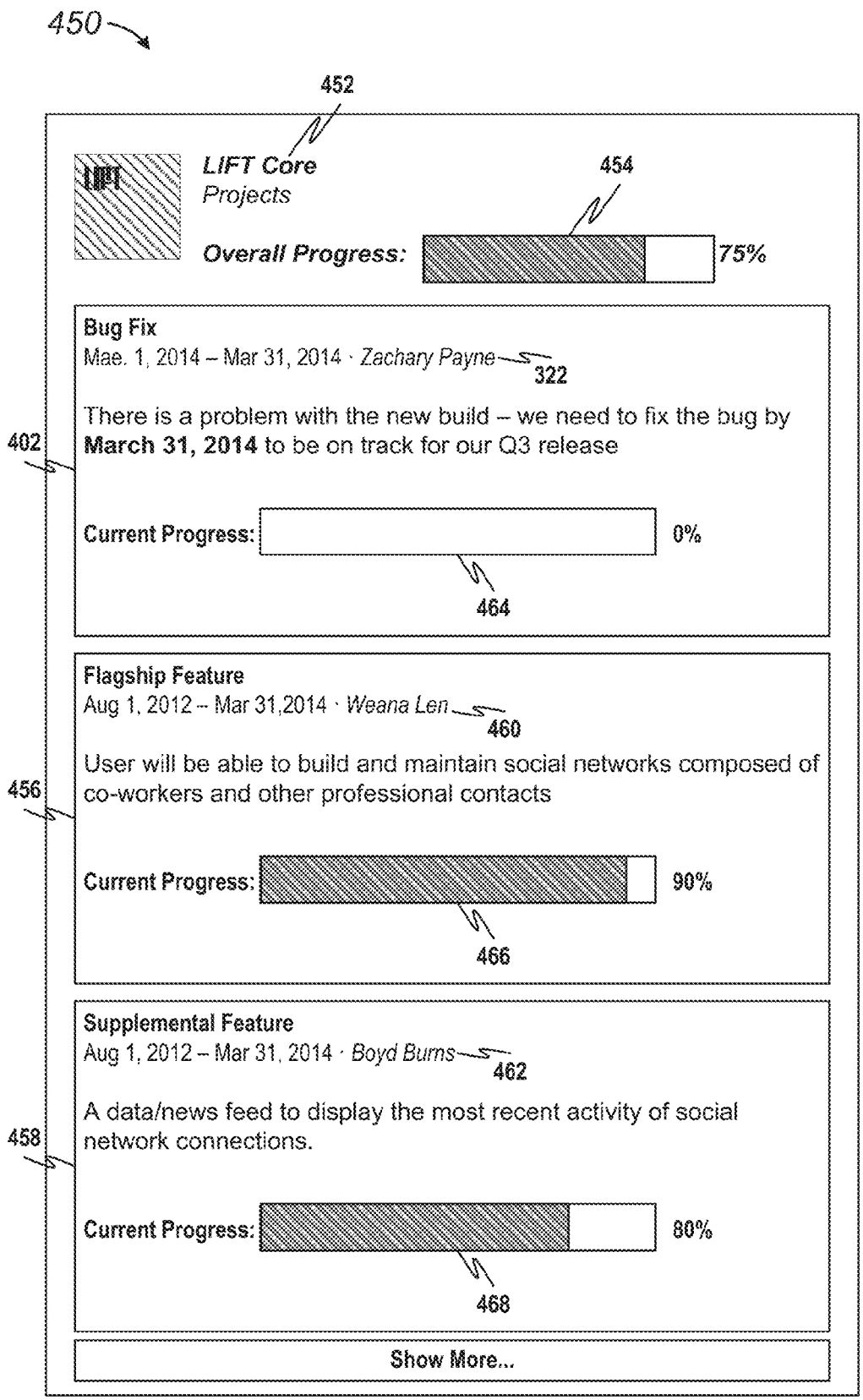
FIG. 4B is an interface diagram illustrating a project status report, according to an example embodiment.

FIG. 4B is an interface diagram illustrating a project status report 450, according to an example embodiment. The project status report 450 provides managers and other administrators with a brief overlook of all tasks making up a project including a respective status of each project. As shown, the project status report 450 includes an identifier of project 452 (e.g., "LIFT Core"), and an overall status indicator 454 for indicating the overall status or progress of the project 452 (e.g., "75% complete"). The overall status indicator 454 is based on the individual status of each task making up the project 452.

The project status report 450 further includes a list of tasks making up the project including tasks 402 (e.g., the task created from content item 306), 456, and 458. The presentation of each task 402, 456, 458 includes a title, a time frame (e.g., a due date or a start and end date), and other information about the task. The presentation of each of the tasks 402, 456, and 458 further includes an identifier of a task assignee for the task, which are indicated in FIG. 4B by elements 322, 460, and 462, respectively. Each of the tasks 402, 456, and 458 included in the project status report 450 further includes status indicators 464, 466, and 468 to indicate the respective status or progress of the tasks 402, 456, and 458.

Figure 5:
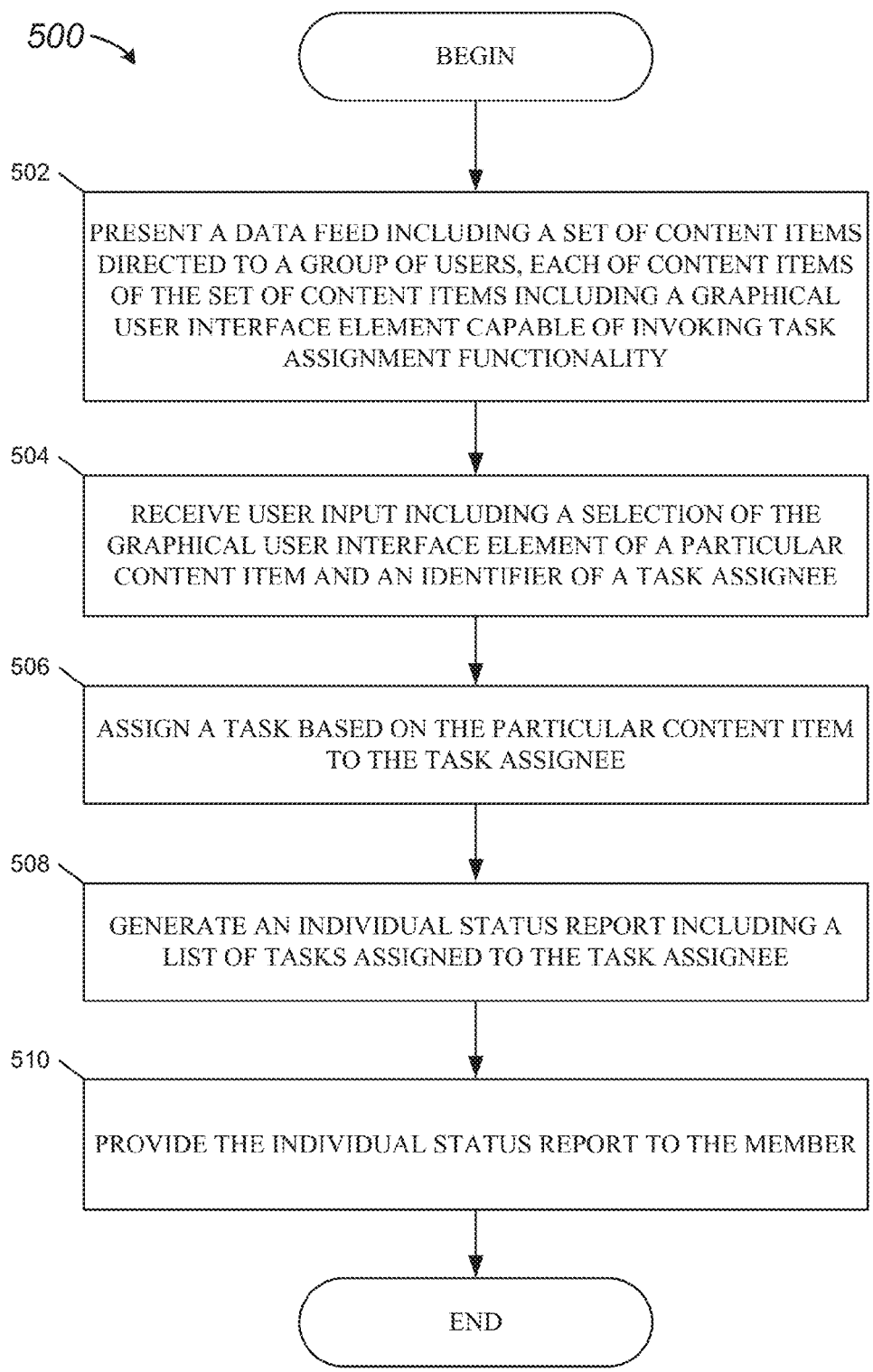
FIG. 5 is a flowchart illustrating a method for assigning a task based on content presented in a feed interface, according to an example embodiment.

FIG. 5 is a flowchart illustrating a method 500 for assigning a task based on content presented in a data feed, according to an example embodiment. The method 500 may be embodied in computer-readable instructions for execution by one or more processors such that the method 500 may be carried out in whole or in part by the social networking platform 102. In particular, the method 500 may be carried out the modules comprising the workplace collaboration application 108, and accordingly, the method 500 is described below by way of example with reference thereto. However, it shall be appreciated that the method 500 may be deployed on various other hardware configurations and is not intended to be limited to the modules forming the workplace collaboration application 108.

At operation 502, the feed module 200 may present a data feed including a set of content items (e.g., status updates) directed to a group of users (e.g., employees of a company). Consistent with some embodiments, the presenting of the data feed may include providing instructions to a client device that cause the client device to present the data feed on a communicatively coupled display. The presentation of the data feed may be embedded within a webpage that includes additional content items. In some instances, content items may include textual comments or messages pertaining to a task (e.g., one of several tasks comprising a project).

Accordingly, each content item included in the data feed may include a graphical user interface element (e.g., a button) capable of invoking task assignment functionality with respect to each content item.

At operation 504, the data feed module 200 may receive user input signalling the selection of the graphical user interface element (e.g., a click or other user interaction) of a particular content item. The user input may also include an identifier of a task assignee (e.g., a member of the group of users). Consistent with some embodiments, the user input may be received in the manner discussed above in reference to FIG. 3A-3C. Responsive to receiving the user input, the task management module 202 may assign a task based on the particular content item to the task assignee, at operation 506.

At operation 508, the report generation module 204 may generate an individual status report for the task assignee. The individual status report may include a list of all tasks assigned to the task assignee and may provide an status indicator (e.g., progress) for each task in the list. The generation of the individual status report by the report generation module 204 may be in response to receiving a user request for such, or in some embodiments, may be performed in response to a new task being assigned to the task assignee (e.g., the task assigned at operation 506).

At operation 510, the social networking platform 102 may provide the individual status report to the task assignee. The individual status report may be presented to the task assignee within a web browser or mobile application designed to communicate with the social networking platform 102, consistent with some embodiments. The individual status report may also be provided to the task assignee through any one of a number of message delivery networks and platforms such as electronic mail (e-mail), instant message (IM), short message system (SMS) message, text, facsimile, or voice (e.g., Voice over IP (VoIP)) messages.

Figure 6:
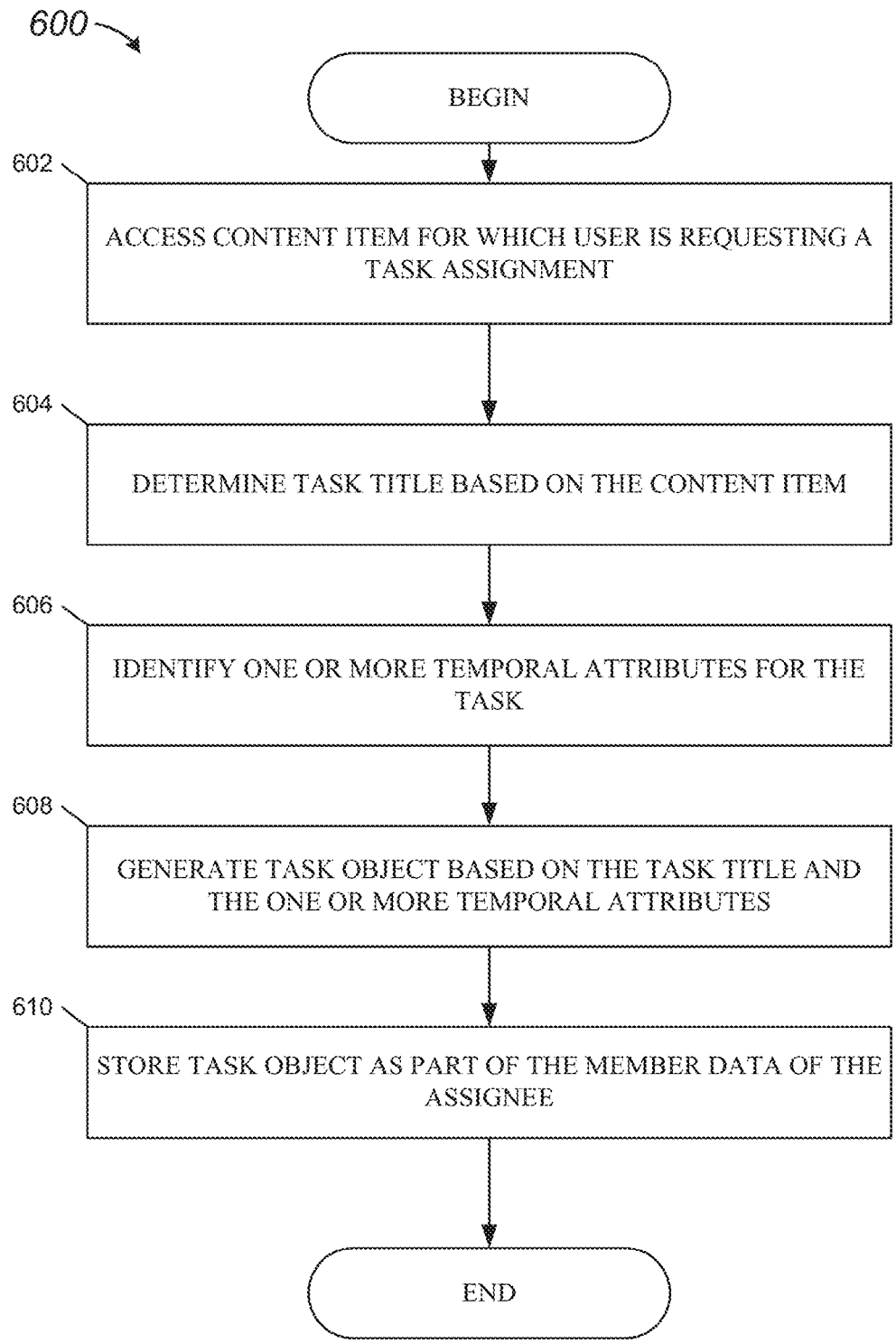
FIG. 6 is a flowchart illustrating a method for generating a task based on content presented in a feed interface, according to an example embodiment.

FIG. 6 is a flowchart illustrating a method 600 for generating a task object based on content presented in a feed interface, according to an example embodiment. The method 600 may be embodied in computer-readable instructions for execution by one or more processors such that the method 600 may be carried out in whole or in part by the social networking platform 102. In particular, the method 600 may be carried out by the modules comprising the workplace collaboration application 108, and accordingly, the method 600 is described below by way of example with reference thereto. However, it shall be appreciated that the method 600 may be deployed on various other hardware configurations and is not intended to be limited to the modules forming the workplace collaboration application 108.

At operation 602, the task management module 202 may access a content item (e.g., a status update) for which a user is requesting a task assignment (e.g., the user has selected the graphical user interface element corresponding to a task assignment). At operation 604, the task management module 202 may determine a task title based on the content item. In some embodiments, the determination of the task title may include utilizing one or more known text recognition techniques to identify a subject from text composing the content item (e.g., composing a status update). In some embodiments, the task title determined at operation 604 may be based on information received from the user.

At operation 606, the task management module 202 may identify one or more temporal attributes for the task. The one or more temporal attributes may, for example, include a due date, a start data, an end date, a remaining time, an amount of time needed to complete the task, or any other temporal limitation affecting the timely completion of the task. The temporal attributes may be determined based on information received from the user, or in some embodiments, based on information included in the content item (e.g., by way of text recognition).

At operation 608, the task management module 202 may generate a task object based on the task title and the one or more temporal attributes. The task object may be a data structure composing the task title and the one or more temporal attributes. At operation 610, the task management module 202 may store the task object (e.g., in database 110) as part of the member data of the assignee (e.g., the user to whom the task is being assigned) such that the task object is associated with and assigned to the user.

Figure 7:
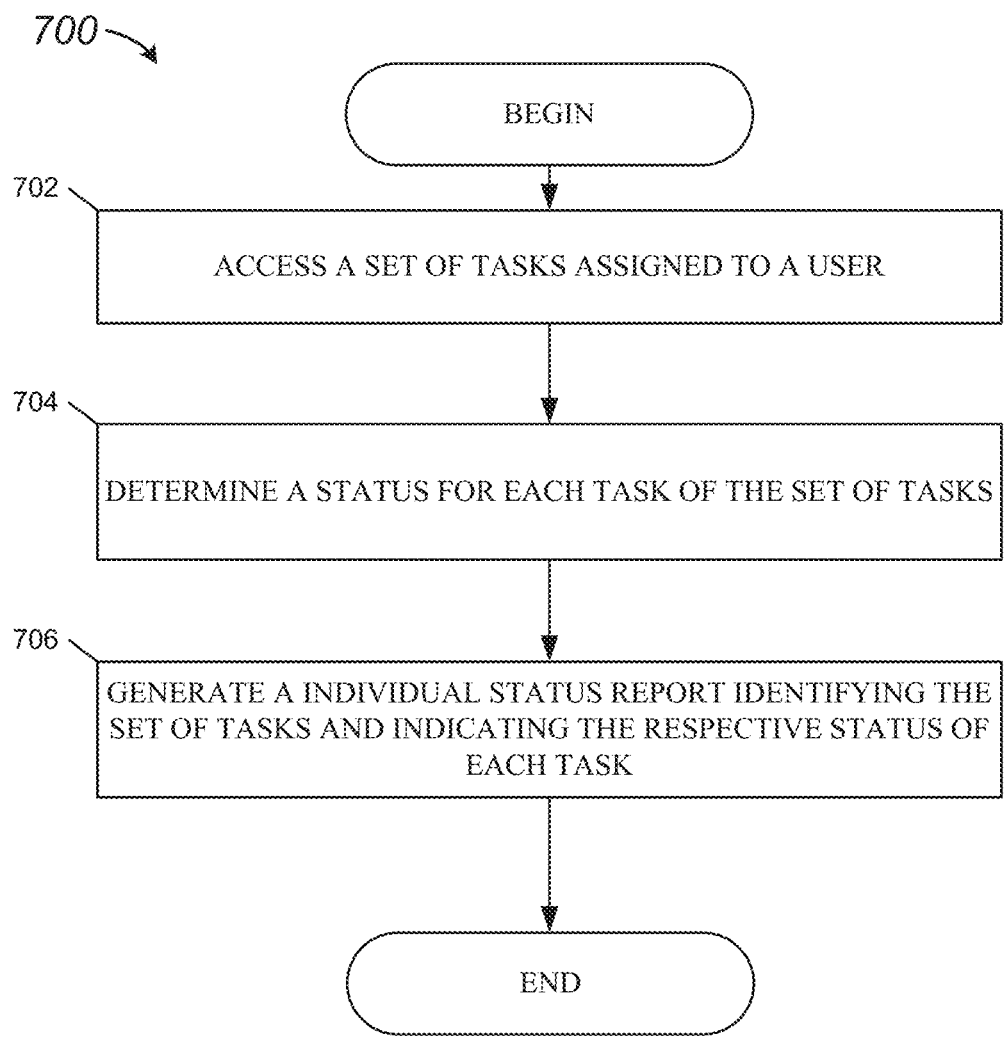
FIG. 7 is a flowchart illustrating a method for generating an individual status report, according to an example embodiment.

FIG. 7 is a flowchart illustrating a method 700 for generating an individual status report, according to an example embodiment. The method 700 may be embodied in computer-readable instructions for execution by one or more processors such that the method 700 may be carried out in whole or in part by the social networking platform 102. In particular, the method 700 may be carried out by the modules forming the workplace collaboration application 108, and accordingly, the method 700 is described below by way of example with reference thereto. However, it shall be appreciated that the method 700 may be deployed on various other hardware configurations and is not intended to be limited to the modules forming the workplace collaboration application 108.

At operation 702, the report generation module 204 may access a set of tasks assigned to a user. Consistent with some embodiments, the set of tasks assigned to the user may correspond to content items presented within a data feed associated with the user (e.g., a data feed directed to an organization to which the user belongs). At operation 704, the report generation module 204 may determine a status for each task of the set of tasks. The status may be based on status information received from the user, or in some instances, may be automatically determined in response to detecting certain actions performed by the user in furtherance of the respective tasks. The status may, for example, be expressed in terms of a percentage of progress achieved, a number of milestones reached, or in more colloquial terms such as "Not Started," "In Progress," and "Complete." At operation 706, the report generation module 204 may generate an individual status report identifying the set of tasks and indicating the respective status of each task.

Figure 8:
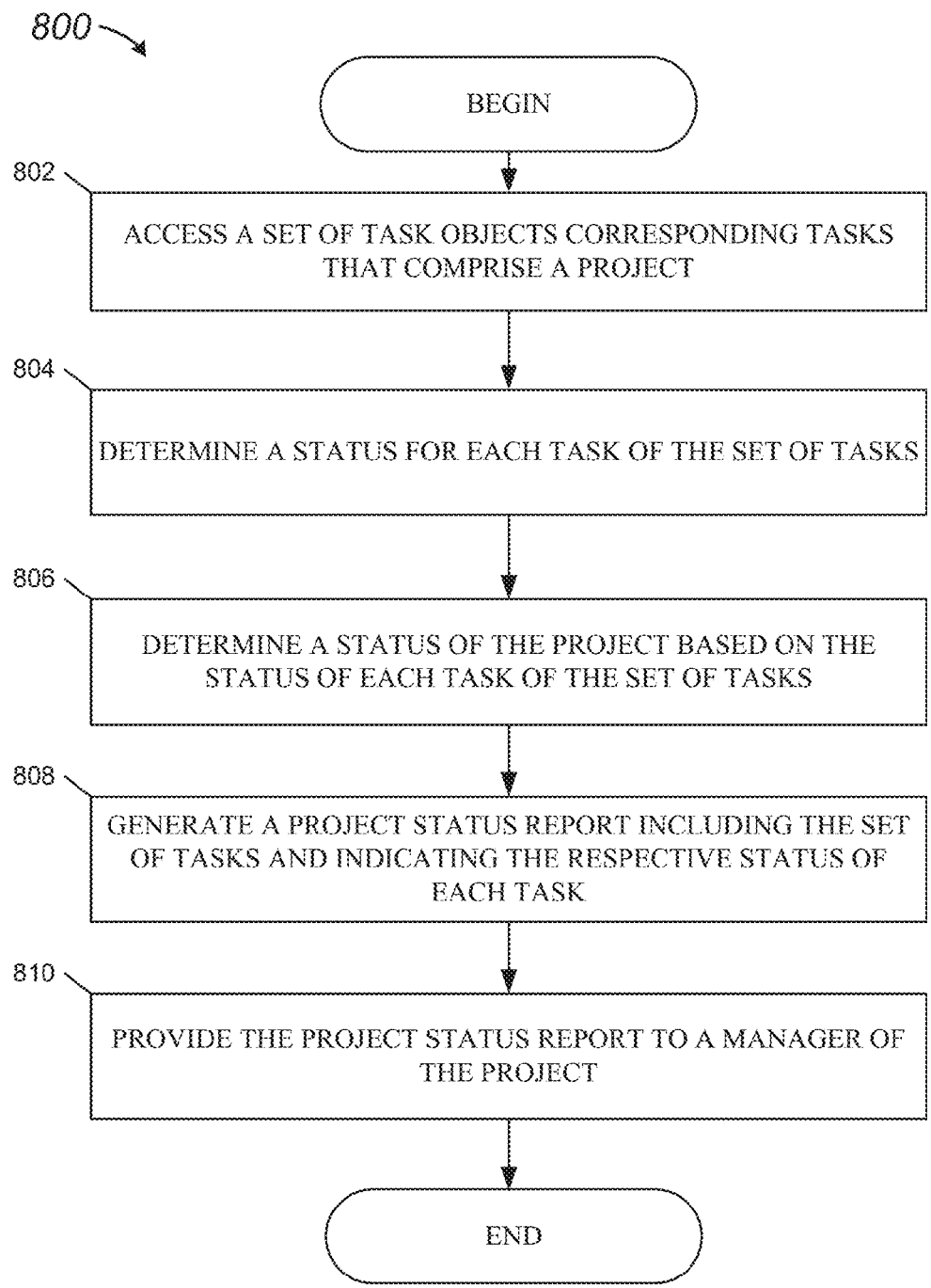
FIG. 8 is a flowchart illustrating a method for generating a project status report, according to an example embodiment.

FIG. 8 is a flowchart illustrating a method 800 for generating a project status report, according to an example embodiment. The method 800 may be embodied in computer-readable instructions for execution by one or more processors such that the method 800 may be carried out in whole or in part by the social networking platform 102. In particular, the method 800 may be carried out by the modules forming the workplace collaboration application 108, and accordingly, the method 800 is described below by way of example with reference thereto. However, it shall be appreciated that the method 800 may be deployed on various other hardware configurations and is not intended to be limited to the modules forming the workplace collaboration application 108.

At operation 802, the report generation module 204 may access a set of tasks objects corresponding to tasks of a project. Each of the tasks may be assigned to one or more users (e.g., the task assignees) employed by a particular company, or in some instances, one or more users that a part of an organization or group within a particular company. The task objects accessed at operation 802 may be stored in a database or across multiple databases.

At operation 804, the report generation module 204 may determine a status for each task of the set of tasks. As discussed above, status of tasks may be based on status information received from users, or in some instances, may be automatically determined in response to detecting certain actions performed by users in furtherance of the respective tasks. At operation 806, the report generation module 204 may determine a status for the project based on the status of each task of the project. The status of the project may be an aggregate of all the statuses of the tasks, an average, a mean, or any number of other statistical summarizations of the statuses of all the tasks.

At operation 808, the report generation module 204 may generate a project status report for the project. The project status report may include a list of all tasks that make up the project (e.g., the set of tasks) and an identifier of the respective task assignees. The project status report may further include a status indicator for each task as well as a status indicator for the entire project.

At operation 810, the report generation module 204 may provide the project status report to a manager or other responsible user of the project. In this manner, the manager or other responsible user may quickly track the status and progress of all tasks of an entire project. The providing of the project status report may include presenting the project status report within a web browser or mobile application designed to communicate with the social networking platform 102, consistent with some embodiments. The project status report may also be provided to the manager or other responsible user through any one of a number of message delivery networks and platforms such as electronic mail (e-mail), instant message (IM), short message system (SMS) message, text, facsimile, or voice (e.g., Voice over IP (VoIP)) messages.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
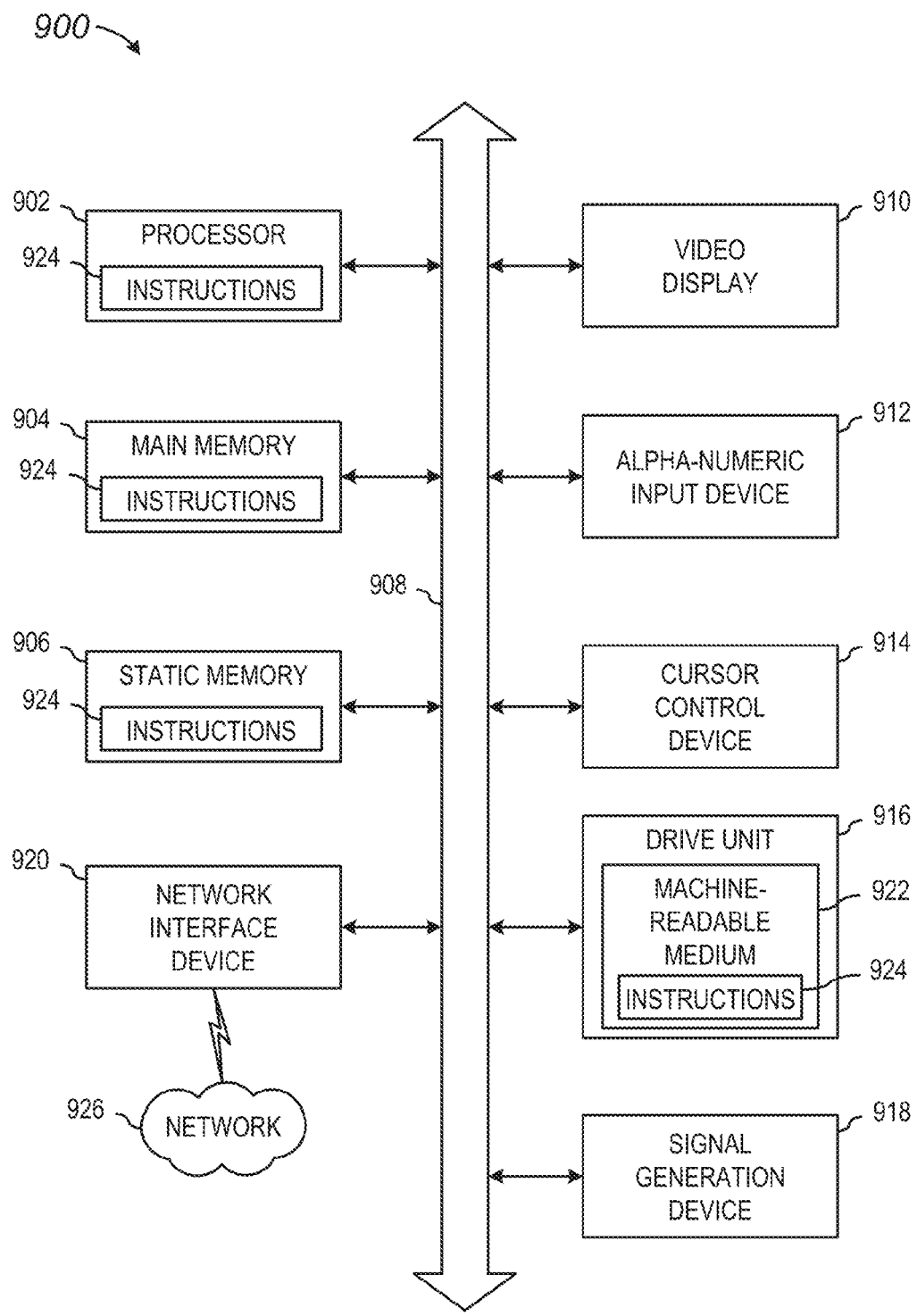
FIG. 9 is a block diagram of a machine in the example form of a computer system within which a set of instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions (e.g., instructions 924) for execution by the machine and that cause the machine to perform any one or more of the methodologies of the present inventive subject matter, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of encoding or carrying instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   causing presentation of a data feed on one or more computing devices of a group of users, the data feed including a set of content items directed to the group of users, each content item of the set of content items including a graphical user interface (GUI) element capable of invoking task assignment functionality;
   receiving user input including a selection of the GUI element of a particular content item of the set of content items and an identifier of a particular user of the group of users;
   responsive to receiving the user input, assigning, using a processor of a machine, a task based on the particular content item to the particular user of the group of users;
   determining, based on information included in the content item, a task start date and a task end date for the task;
   accessing a set of tasks assigned to the particular user; the set of tasks including the task assigned to the particular user based on the particular content item;
   determining a status for each task of the set of tasks based on information received from the particular user indicating an amount of progress achieved in furtherance of the corresponding task;
   generating an individual status report including the list of tasks assigned to the particular user, the individual status report including a status indicator and temporal attributes for each task of the list of tasks, each status indicator including a numerical value corresponding to the amount of progress achieved in furtherance of the corresponding task, the temporal attributes of each task including a date range for the corresponding task;
   causing display of the individual status report within the data feed presented on a first computing device from among the one or more computing devices, the first computing device corresponding to the particular user;
   generating a project status report corresponding to a project comprising a plurality of tasks assigned to the group of users, the plurality of tasks including the task assigned to the particular user, the generating of project status report including determining an overall project status based on an aggregate of an respective progress of each task in the plurality of tasks, the project status report including an indicator of the overall project status;
   causing display of the project status report within the data feed presented on at least a second computing device from among the one or more computing devices corresponding to the group of users;
   determining an updated status for at least one task based on updated information received from at least one user of the group of users; and
   updating the data feed presented on at least the second computing device based on the updated status for the at least one task, the updating of the data feed including updating the indicator of the overall project status.

2. The method of claim 1, wherein the status indicator is variable in color, and wherein the color of the indicator indicates the amount of progress.

3. The method of claim 1, wherein the group of users belong to a common organization within a company.

4. The method of claim 3, wherein the indicator of the overall project status includes a numerical value indicating an amount of progress on the overall project.

5. The method of claim 1, wherein the project status report includes a status indicator for each task in the plurality of tasks of the project.

6. The method of claim 1, wherein the assigning the task based on the particular content item comprises:
   determining a title of the task based on the content item;
   generating a task object; the task object being a data structure including the title and the temporal attributes; and
   storing the task object as part of member data of the particular user.

7. The method of claim 1, wherein the set of content items includes text pertaining to the plurality of tasks of the project.

8. The method of claim 1, wherein the data feed further provides additional GUI elements to provide feedback pertaining to the set of content items.

9. A non-transitory machine-readable storage medium embodying instructions that, when executed by a machine, cause the machine to perform operations comprising:
   causing presentation of a data feed on one or more computing devices of a group of users, the data feed including a set of content items directed to the group of users, each content item of the set of content items including a graphical user interface (GUI) element capable of invoking task assignment functionality;
   receiving user input including a selection of the GUI element of a particular content item of the set of content items and an identifier of a particular user of the group of users;
   responsive to receiving the user input, assigning, using a processor of a machine, a task based on the particular content item to the particular user of the group of users;
   determining, based on information included in the content item, a date range for the task;
   accessing a set of tasks assigned to the particular user, the set of tasks including the task assigned to the particular user based on the particular content item;
   determining a status for each task of the set of tasks based on information received from the particular user indicating an amount of progress achieved in furtherance of the corresponding task;
   generating an individual status report including the list of tasks assigned to the particular user, the individual status report including a status indicator and temporal attributes for each task of the list of tasks, each status indicator including a numerical value corresponding to the amount of progress achieved in furtherance of the corresponding task, the temporal attributes of each task including a task start date and a task end date for the corresponding task;

causing display of the individual status report within the data feed presented on a first computing device from among the one or more computing devices, the first computing device corresponding to the particular user;

generating a project status report corresponding to a project comprising a plurality of tasks assigned to the group of users, the plurality of tasks including the task assigned to the particular user, the generating of project status report including determining an overall project status based on an aggregate of an respective progress of each task in the plurality of tasks, the project status report including an indicator of the overall project status;

causing display of the project status report within the data feed presented on at least a second computing device from among the one or more computing devices corresponding to the group of users;

determining an updated status for at least one task based on updated information received from at least one user of the group of users; and updating the data feed presented on at least the second computing device based on the updated status for the at least one task, the updating of the data feed including updating the indicator of the overall project status.

10. The non-transitory machine-readable storage medium of claim 9, wherein the status indicator includes a percentage of progress.

11. The non-transitory machine-readable storage medium of claim 10, wherein the status indicator of the status of each task is text.

12. The non-transitory machine-readable storage medium of claim 9, wherein the task is one of multiple tasks of a project, and wherein the data feed is presented to a particular user within the group of users, the particular user responsible for the project.

13. The non-transitory machine-readable storage medium of claim 12, wherein the project status report further includes:
an individual status for each task of the plurality of tasks;
a textual description of each task in the plurality of tasks; and
an identifier of an assigned user for each task in the plurality of tasks.

14. A system comprising:
a processor of a machine;
a computer-readable medium having instructions store there on, which, when executed by a processor, cause the system to perform operations comprising:
causing presentation of a data feed on one or more computing devices of a group of users, the data feed including a set of content items directed to the group of users, each content item of the set of content items including a graphical user interface (GUI) element capable of invoking task assignment functionality;
receiving user input including a selection of the GUI element of a particular content item of the set of content items and an identifier of a particular user of the group of users;
responsive to receiving the user input, assigning, using a processor of a machine, a task based on the particular content item to the particular user of the group of users;
determining, based on information included in the content item, a date range for the task;
accessing a set of tasks assigned to the particular user, the set of tasks including the task assigned to the particular user based on the particular content item;
determining a status for each task of the set of tasks based on information received from the particular user indicating an amount of progress achieved in furtherance of the corresponding task;
generating an individual status report including the list of tasks assigned to the particular user, the individual status report including a status indicator and temporal attributes for each task of the list of tasks, each status indicator including a numerical value corresponding to the amount of progress achieved in furtherance of the corresponding task, and the temporal attributes of each task including a task start date and a task end date for the corresponding task;
causing display of the individual status report within the data feed presented on a first computing device from among the one or more computing devices, the first computing device corresponding to the particular user;
generating a project status report corresponding to a project comprising a plurality of tasks assigned to the group of users, the plurality of tasks including the task assigned to the particular user, the generating of project status report including determining an overall project status based on an aggregate of an respective progress of each task in the plurality of tasks, the project status report including an indicator of the overall project status;
causing display of the project status report within the data feed presented on at least a second computing device from among the one or more computing devices corresponding to the group of users;
determining an updated status for at least one task based on updated information received from at least one user of the group of users; and
updating the data feed presented on at least the second computing device based on the updated status for the at least one task, the updating of the data feed including updating the indicator of the overall project status.

* * * * *

UNITED STATES PATENT AND TRADEMARK OFFICE
CERTIFICATE OF CORRECTION

| | |
|---|---|
| PATENT NO. | : 9,846,527 B2 |
| APPLICATION NO. | : 14/266573 |
| DATED | : December 19, 2017 |
| INVENTOR(S) | : Hull et al. |

Page 1 of 1

It is certified that error appears in the above-identified patent and that said Letters Patent is hereby corrected as shown below:

In the Claims

In Column 17, Line 43, in Claim 1, delete "user;" and insert --user,-- therefor

In Column 18, Line 29, in Claim 6, delete "object;" and insert --object,-- therefor Signed and Sealed this
Twenty-eighth Day of May, 2019

Andrei Iancu
*Director of the United States Patent and Trademark Office*